(12) United States Patent
Sussmeier

(10) Patent No.: US 9,406,175 B2
(45) Date of Patent: Aug. 2, 2016

(54) MULTI-SHIPPER PACKAGE TAPE DISPENSING AND QUALITY CONTROL SYSTEM

(71) Applicant: Pitney Bowes Inc., Danbury, CT (US)

(72) Inventor: John W. Sussmeier, Cold Spring, NY (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 14/561,507

(22) Filed: Dec. 5, 2014

(65) Prior Publication Data

US 2016/0163123 A1      Jun. 9, 2016

(51) Int. Cl.
*G06F 19/00*      (2011.01)
*G07C 3/00*       (2006.01)

(52) U.S. Cl.
CPC ........................ *G07C 3/00* (2013.01)

(58) Field of Classification Search
CPC .... B65B 57/00; B65B 11/025; B65B 11/045; B65B 11/00; B65B 11/18; B65B 2011/002; B65B 2210/18; B65B 2210/20; B65B 25/007; B65B 25/16; B65B 25/18; B65B 35/06; B65B 41/16; B65B 57/02; B65B 5/04
USPC ........................ 235/385, 486, 375
See application file for complete search history.

(56) References Cited

U.S. PATENT DOCUMENTS

| 4,809,481 A * | 3/1989 | Fruh | B65B 65/003 53/452 |
| 5,557,510 A * | 9/1996 | McIntyre | A01F 15/07 172/75 |
| 2003/0010456 A1 * | 1/2003 | Lemens | B32B 37/226 156/555 |
| 2004/0060264 A1 * | 4/2004 | Miller | B65B 11/18 53/461 |
| 2007/0193917 A1 * | 8/2007 | Munoz | B25H 3/022 206/575 |
| 2012/0061414 A1 | 3/2012 | Bundy | |

FOREIGN PATENT DOCUMENTS

WO      2007047483 A2      4/2007

\* cited by examiner

*Primary Examiner* — Thien M Le
(74) *Attorney, Agent, or Firm* — Michael J. Cummings; Charles R. Malandra, Jr.; Steven J. Shapiro

(57) ABSTRACT

A system for handling tape dispensers to be used by parcel preparation workers. Identification markings on the parcels are scanned. The identification markings are matched with corresponding different kinds of packaging tape. A tape dispenser receptacle holds a plurality of tape dispensers in respective cradles. Each of the cradles has an associated display indicator that is activated based on the type of packaging tape determined by the scanner and the processor.

18 Claims, 3 Drawing Sheets

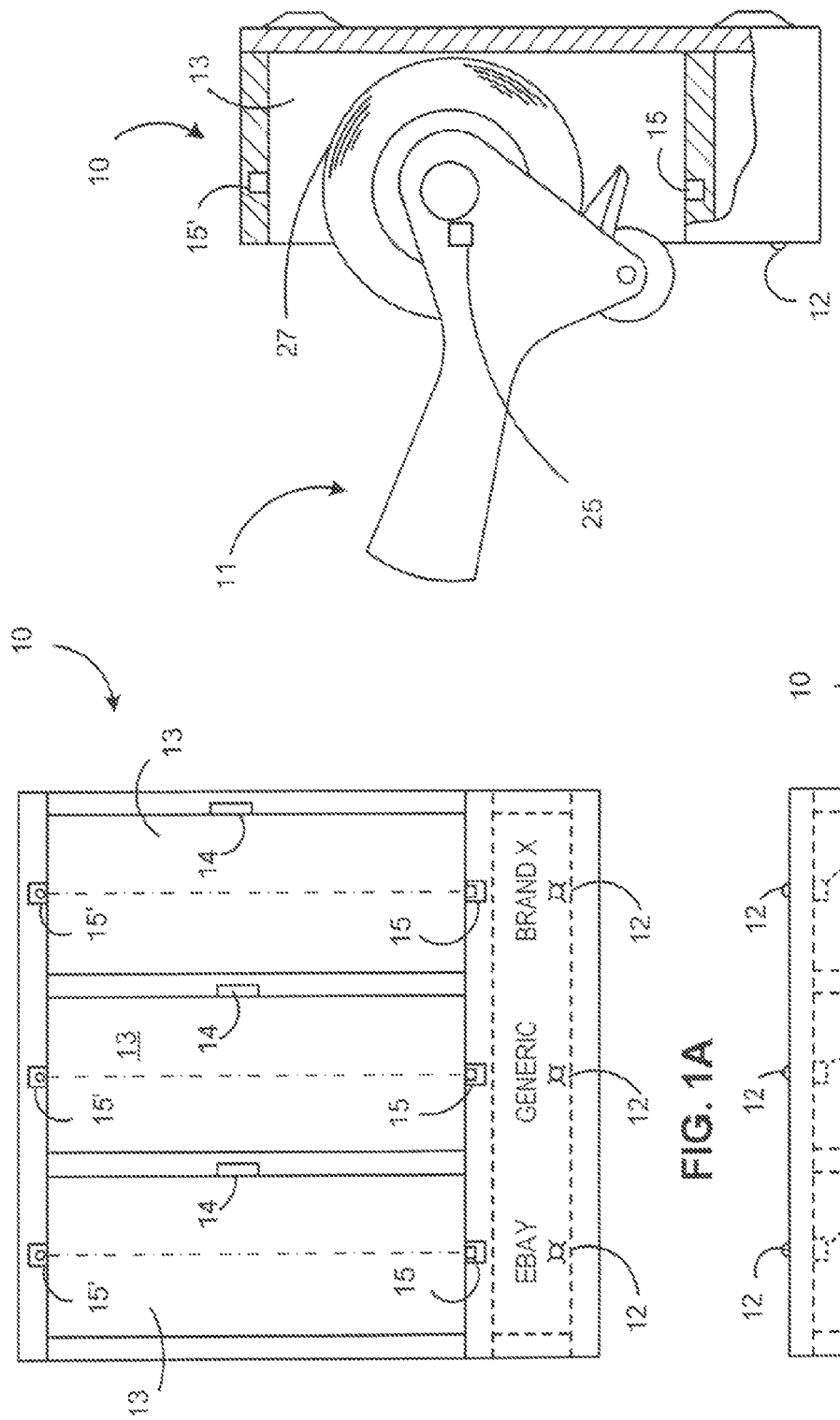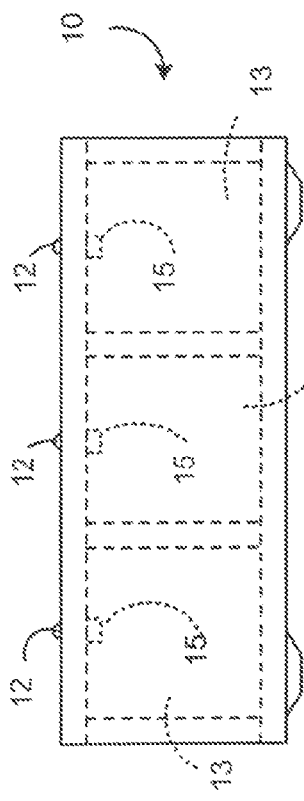

MULTI-SHIPPER PACKAGE TAPE DISPENSING AND QUALITY CONTROL SYSTEM

TECHNICAL FIELD

The present invention relates to managing use of the proper packaging material in a multi-shipper parcel processing facility.

BACKGROUND OF THE INVENTION

With the growth of on-line shopping, more and more merchandise items are being packaged and shipped. Rather than handle it all themselves, on-line sellers can outsource various aspects of the parcel preparation process. For example, one challenging aspect of parcel ship in is international delivery processing. International shipping can require special knowledge of shipping fees, customs compliance, duties and taxes. Thus, an opportunity arises for third party service providers to process parcels originating from multiple on-line sellers, and to gain various efficiencies and economy of scale while also improving the on-line shopping experience.

When working on packages originating from multiple sellers, the service provider must be sensitive to any individual requirements that the sellers may have. For example, different sellers may want their own special packing tape used on the exterior of their packages. Such special tape will typically include the seller's name and logo. However, with different types of tape being used, the possibility arises that a worker could put the wrong tape on a package. This could result in confusion on the part of the recipient, and potentially hurt the reputation of the seller.

SUMMARY OF THE INVENTION

To address the problem described above, a new system is described for handling tape dispensers to be used by parcel processing workers. The system handles different tape rolls to be used on different corresponding packages. For example, the different rolls of tape may typically have the names and logos of different Internet merchandise companies.

The system scans identification markings on the packages. A processor, in communication with the scanner, matches the scanned identification markings with the corresponding different kinds of packaging tape. A tape dispenser receptacle with a group of cradles is connected to the processor. Each of the cradles is associated with a particular type of packaging tape. Each of the cradles also has an associated display indicator that is activated based on the type of packaging tape determined by the scanner and the processor. The indicators can be LED lamps.

In the preferred embodiment, the cradles each have a sensor to detect whether the cradle is empty. Thus, it can be determined if the proper tape dispenser has been removed, and an error signal is generated when the wrong cradle is sensed to be empty. The sensor can be an optical sensor, a mechanical spring sensor, or any other suitable type of sensor. The system may also include an audible alarm that is activated by the error signal. The error condition can be displayed on a screen and the system can be paused to prohibit further processing until the error condition is corrected.

In a further preferred embodiment, the tape dispensers include identification tags on them that provide further error sensing capabilities. Each dispenser is assigned a corresponding type of packaging tape. The cradles are then modified to include additional sensors for detecting the specific identification tags when the dispensers are in the cradles. An error signal is again generated when the identification tag sensors determine that an incorrect identification tag has been removed from the tape dispenser receptacle. In this preferred embodiment, the identification tags can be RFID tags and the identification tag sensors would be RF receivers.

BRIEF DESCRIPTION OF THE DRAWINGS

FIG. 1A shows an overhead view of the tape dispenser receptacle used in connection with the tape dispenser management system.

FIG. 1B shows an end view of the tape dispenser receptacle.

FIG. 1C shows a side view of the tape dispenser receptacle, with the tape dispenser in its resting position.

DETAILED DESCRIPTION

Figure 2:
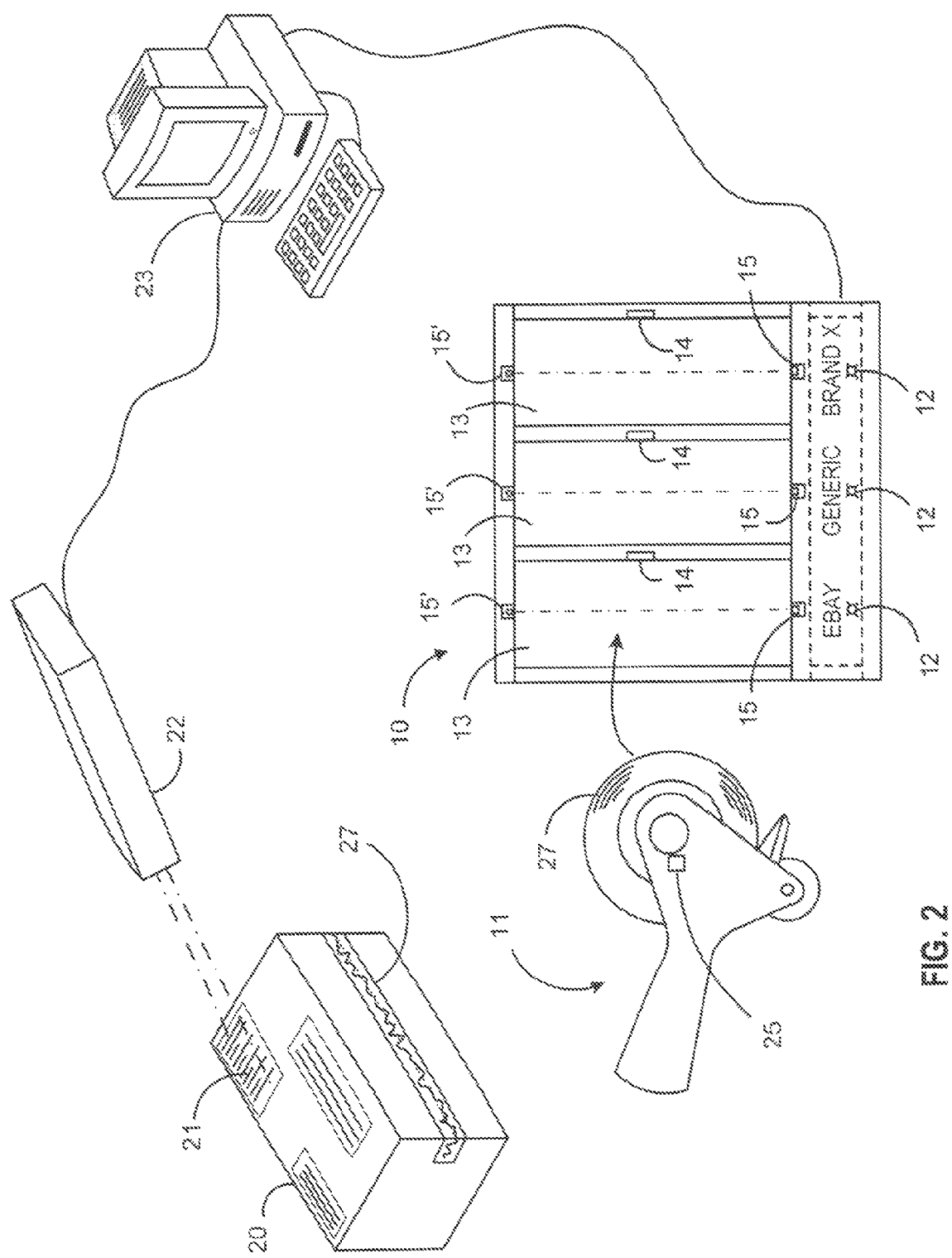
FIG. 2 snows a preferred embodiment of the tape dispenser management system.

FIG. 1 shows details of the tape dispenser receptacle 10 in accordance with a preferred embodiment. The receptacle 10 includes a series of cradles 13 for holding tape dispensers 11 when they are not in use. Each tape dispenser 11 can be loaded with a different type of tape 27 for use on different sellers' packages. Typically, the different tapes 27 will have different logos and brands that are representative of different shippers, but different tape stocks can be applicable for other purposes. For example, the different stocks of tape 27 might have selectable holiday messages, or different strengths, or they might have different performance properties to be selected based characteristics of the parcel contents, in the preferred embodiment, the tape 27 is a pressure sensitive tape that is applied by a standard hand held dispenser 11.

Each cradle 13 has an indicator light is lit to indicate which of the tape dispensers 11 is to be used for a particular parcel. The cradles 13 also have sensor 15 to detect the presence of a dispenser 11 in the cradle 13. In the preferred embodiment, these sensors 15 are comprised of optical sensors that include an infra-red light emitter and detector pair located such that the emitter beam is always blocked with the cradle is occupied.

The overall tape dispenser management system is depicted in FIG. 2. A scanner 22 is used to scan information 20 or 21 on a parcel. The scanner 22 can be a handheld device or it can be a camera that is integrated on a piece of equipment for handling and transporting the parcels. The scanned information could be a return address 20 that is interpreted via optical character recognition software, or a barcode 21, that is interpreted by standard barcode reading software.

The scanner 22 is in communication with a processing computer 23 which is in turn in communication with the tape dispenser receptacle 10. Based on the information received from the scanner 22 the processing computer 23 determines which tape dispenser 11 is to be used and which corresponding indicator light 12 is to be lit. Processing computer 23 also receives sensor 15 feedback from the receptacle 10 indicating which cradles 13 are occupied, or empty, at a given time. Processing computer 23 is preferably a conventional desktop computer with a monitor, keyboard, processor, and USB communication capabilities for connection to the scanner 22 and the dispenser receptacle 10. However, the processor computer can be any kind of conventional processing device, including a hand-held device, or a processor that is fully integrated with the receptacle 10.

In a further embodiment, dispensers 11 can be individually marked by identifier tags 25 that serve to further distinguish in dispensers 11. An ID sensor 14 is positioned in each cradle 13 to detect the identifier tags 25 of the dispensers 11 placed therein. Thus, in addition to the functionality of detecting whether a cradle 11 is occupied, the system can have the capability of determining that the specific dispensers 11 are placed in specific cradles. Preferably, identifier tags 25 are RFID tags that are in communication with radio frequency receivers 14.

Figure 3:
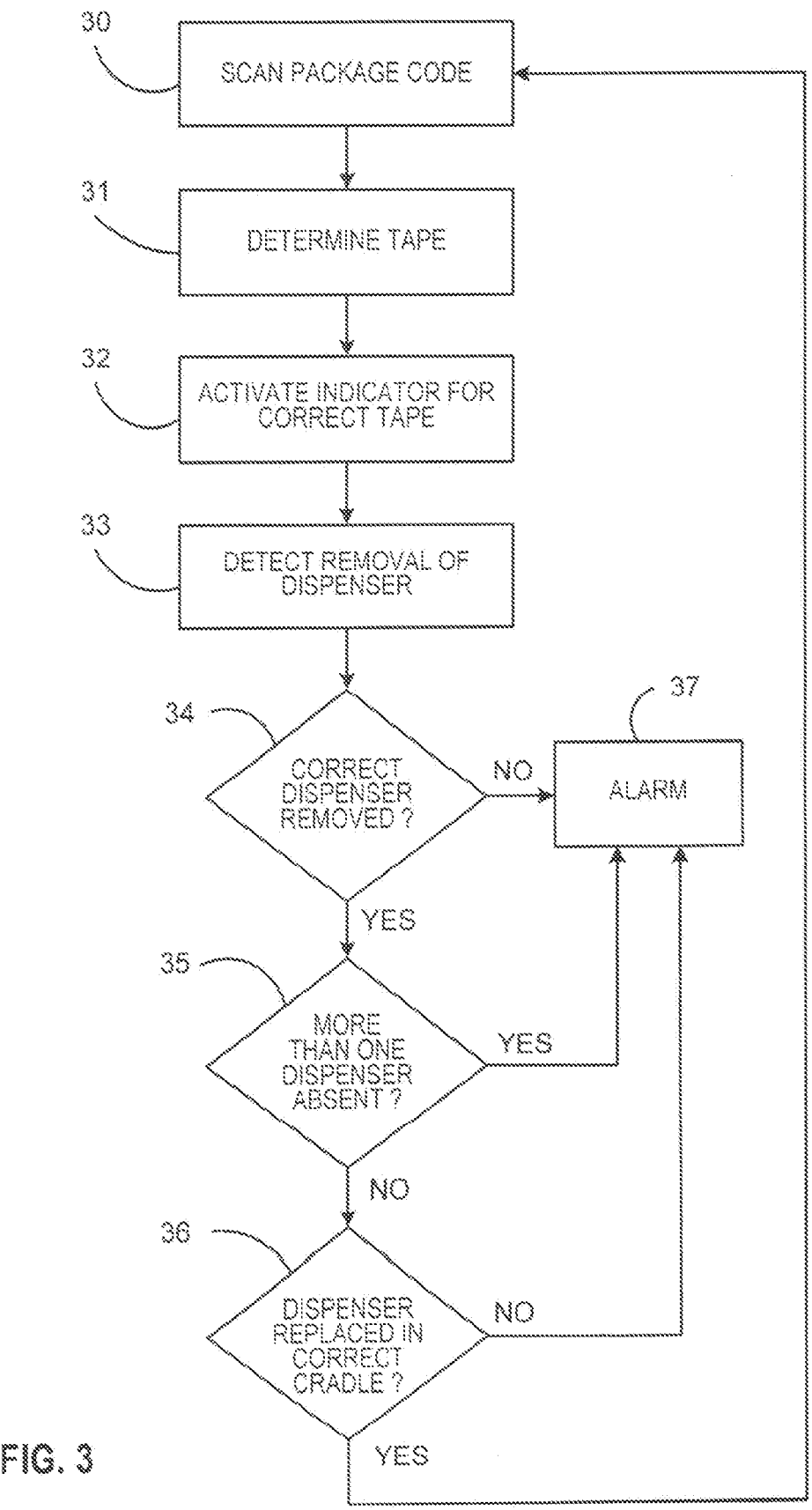
FIG. 3 shows an exemplary flow diagram for operation of the tape dispenser management system.

FIG. 3 shows the process flow for use of the tape dispenser management system. At step 30 the package is scanned by the scanner 30. The scanned information might include the identity of the package sender, or some other identifier. At step 31 the processing computer 23 determines the type of tape to be used by matching the scanned information to as corresponding tape stock identified in a data file. At step 32, the processing computer 23 then signals the receptacle 10 to activate the indicator light 12 for the correct tape dispenser 11, determined to match the requirements from the scanned information of the package.

Subsequent to the indicator being activated, the cradle occupied sensors 15 are used by the processing computer 23 to determine whether the correct dispenser 11 has been removed from its cradle 13. If the sensors indicate that an incorrect cradle 13 is empty, then an error signal is generated and an alarm step 37 is initiated. At step 35, it is seen that an alarm step is initiated if more than one dispenser is absent, which could also mean that the wrong dispenser is being used. At step 36, the identification tags 25 and ID sensors 14 are used to confirm that the correct dispensers 11 are replaced in their cradles.

Returning to the alarm step 37, in a preferred embodiment an audible alarm is activated by the processing computer 23 to alert the operator to the sensed error condition. A display screen on the processing computer 23 can describe the nature of the error condition and appropriate remedial action. Further, the operation of the processing computer 23 and the system can be paused unto the error condition is fixed. An error signal may also be sent to a supervisory computer, so that a supervisor of the operator can be alerted to the problem.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A tape dispenser system for handling different tape rolls to be used on different corresponding packages, the system including:
 a scanner for scanning identification markings on packages;
 a processor in operative communication with the scanner, the processor configured for matching scanned identification markings with corresponding different kinds of packaging tape;
 a tape dispenser receptacle in operative communication with the processor and having a plurality of tape dispenser cradles, each of the cradles being associated with a particular type of packaging tape, and each of the cradles having an associated display indicator, whereby the processor causes one of the associated display indicators to be activated based on the type of packaging tape associated with the scanned identification marking.

2. The tape dispenser system of claim 1 wherein the cradles each further include a sensor, in communication with the processor, to detect whether the cradle is empty, and wherein the processor is further configured to generate an error signal when a cradle becomes empty when it is not a correct cradle associated with the packaging tape associated with the scanned identification marking.

3. The tape dispenser system of claim 2 wherein the sensor is an optical sensor.

4. The tape dispenser system of claim 2 wherein the sensor is a mechanical spring sensor.

5. The tape dispenser system of claim 2 further including an audible alarm that is activated by the processor upon occurrence of the error signal.

6. The tape dispenser system of claim 2 further including a display screen in communication with the processor, the display screen displaying an error message upon occurrence of the error signal, and whereby the processor is further configured to stop processing of further packages until the error signal is removed by correction of a condition that caused the error signal.

7. The tape dispenser system of claim 1 wherein the tape dispensers include identification tags corresponding to the type of packaging tape in the tape dispensers, and the cradles include identification tag sensors for detecting identification tags that are within the cradles and wherein the processor is further configured to generate an error signal when the identification tag sensors determine that an incorrect identification tag has been removed from the tape dispenser receptacle, the incorrect identification tag being other than the correct identification tag corresponding with the packaging tape associated with the scanned identification marking.

8. The tape dispenser system of claim 7 wherein the identification tags are RFID tags and the identification tag sensors are RF receivers.

9. The tape dispenser system of claim 7 further including an audible alarm that is activated by the processor upon occurrence of the error signal.

10. The tape dispenser system of claim 7 further including a display screen in communication with the processor, the display screen displaying an error message upon occurrence of the error signal, and whereby the processor is further configured to stop processing of further packages until the error signal is removed by correction of a condition that caused the error signal.

11. The tape dispenser system of claim 1 wherein the display indicators are LED lamps associated with each cradle.

12. The tape dispenser system of claim 1 wherein the different tape rolls correspond to different shippers and the identification markings identify particular shippers.

13. A method for handling of packages that require use of different packaging tape for different packages, wherein tape dispensers are stored in a receptacle having a plurality of tape dispenser cradles, each of the cradles being associated with a particular type of packaging tape, and each of the cradles having an associated display indicator, the method including:
 scanning identification markings on packages;
 matching scanned identification markings with corresponding different kinds of packaging tape; and
 activating one of the associated display indicators based on the type of packaging tape associated with the scanned identification marking.

14. The method of claim 13 wherein the cradles each further include a sensor and including steps of detecting whether the cradle is empty with the sensor, and generating an error signal when a cradle becomes empty when it is not a correct cradle associated with the packaging tape associated with the scanned identification marking.

15. The method of claim 14 further including displaying an error message upon occurrence of the error signal, and stopping processing of further packages until the error signal is removed by correction of a condition that caused the error signal.

16. The method of claim 13 wherein the tape dispensers include identification tags corresponding to the type of packaging, tape in the tape dispensers, and the cradles include identification tag sensors for detecting identification tags that are within the cradles; and including the step of generating an error signal when the identification tag sensors determine that an incorrect identification tag has been removed from the tape dispenser receptacle, the incorrect identification tag being other than the correct identification tag corresponding with the packaging tape associated with the scanned identification marking.

17. The method of claim 16 further including displaying an error message upon occurrence of the error signal, and stopping processing of further packages until the error signal is removed by correction of a condition that caused the error signal.

18. The method of claim 13 wherein the different tape rolls correspond to different shippers and the identification markings identify particular shippers.

\* \* \* \* \*